(12) United States Patent
Kao

(10) Patent No.: US 6,457,915 B1
(45) Date of Patent: Oct. 1, 2002

(54) DUST COLLECTOR OF CEILING DRILLER

(76) Inventor: Chin-Fa Kao, No. 348, Lu Tong Rd., Lu Kang Township, Chang Hua Hsien (TW)

( * ) Notice: Subject to any disclaimer, the term of this patent is extended or adjusted under 35 U.S.C. 154(b) by 0 days.

(21) Appl. No.: 09/595,967

(22) Filed: Jun. 19, 2000

(51) Int. Cl.⁷ .............................................. B23B 45/00
(52) U.S. Cl. ....................................... 408/67; 408/204
(58) Field of Search ........................ 408/67, 204, 206, 408/207, 209, 241 G

(56) References Cited

U.S. PATENT DOCUMENTS 3,936,213 A * 2/1976 Kappel ........................ 408/67
5,292,210 A * 3/1994 Nowick ........................ 408/67
6,120,220 A * 9/2000 Speare ........................ 408/67
6,193,448 B1 * 2/2001 Brennan ...................... 408/67

FOREIGN PATENT DOCUMENTS

DE  3140776  * 4/1983  ................. 408/67

* cited by examiner

*Primary Examiner*—Steven C. Bishop
(74) *Attorney, Agent, or Firm*—Harrison & Egbert

(57) ABSTRACT

A ceiling driller including a dust collector, a seat rod, a drill bit, an adjustment rod, two tool mounting seats, two machining tools, a spring, and a nut. The dust collector is provided with a plurality of dust collecting slots for collecting the machining dust which is forced into the dust collecting slots by the air current brought about by the rotational motion of the seat rod and the machining tools of the ceiling driller.

1 Claim, 5 Drawing Sheets

DUST COLLECTOR OF CEILING DRILLER

BACKGROUND OF THE INVENTION

1. Field of the Invention

The present invention relates generally to a ceiling driller, and more particularly to a dust collector of the ceiling driller.

2. Description of Related Art

As shown in FIG. 1, a prior art ceiling driller is provided with a transparent dust collector for collecting the machining dust. It is conceivable that the machining dust will eventually accumulated in the dust collector, and that the accumulated dust will obstruct the view of the operator of the ceiling driller, and further that the accumulated dust will interfere with the operation of the ceiling driller.

BRIEF SUMMARY OF THE INVENTION

The primary objective of the present invention is to provide a ceiling driller with a machining dust collector which is free from the shortcomings of the machining dust collector of the prior art described above.

In keeping with the principle of the present invention, the foregoing objective of the present invention is accomplished by the machining dust collector which is provided with a plurality of dust collecting slots for collecting the machining dust which is forced into the dust collecting slots by the air current generated by the ceiling driller in operation.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
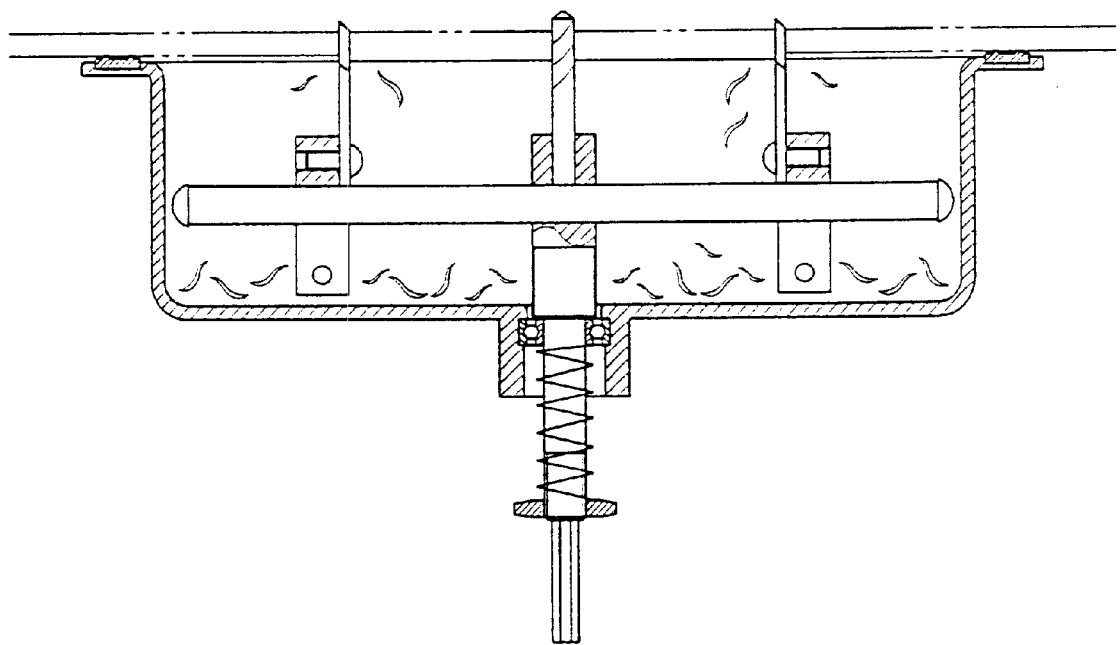
FIG. 1 shows a schematic view of a prior art ceiling driller.
Figure 2:
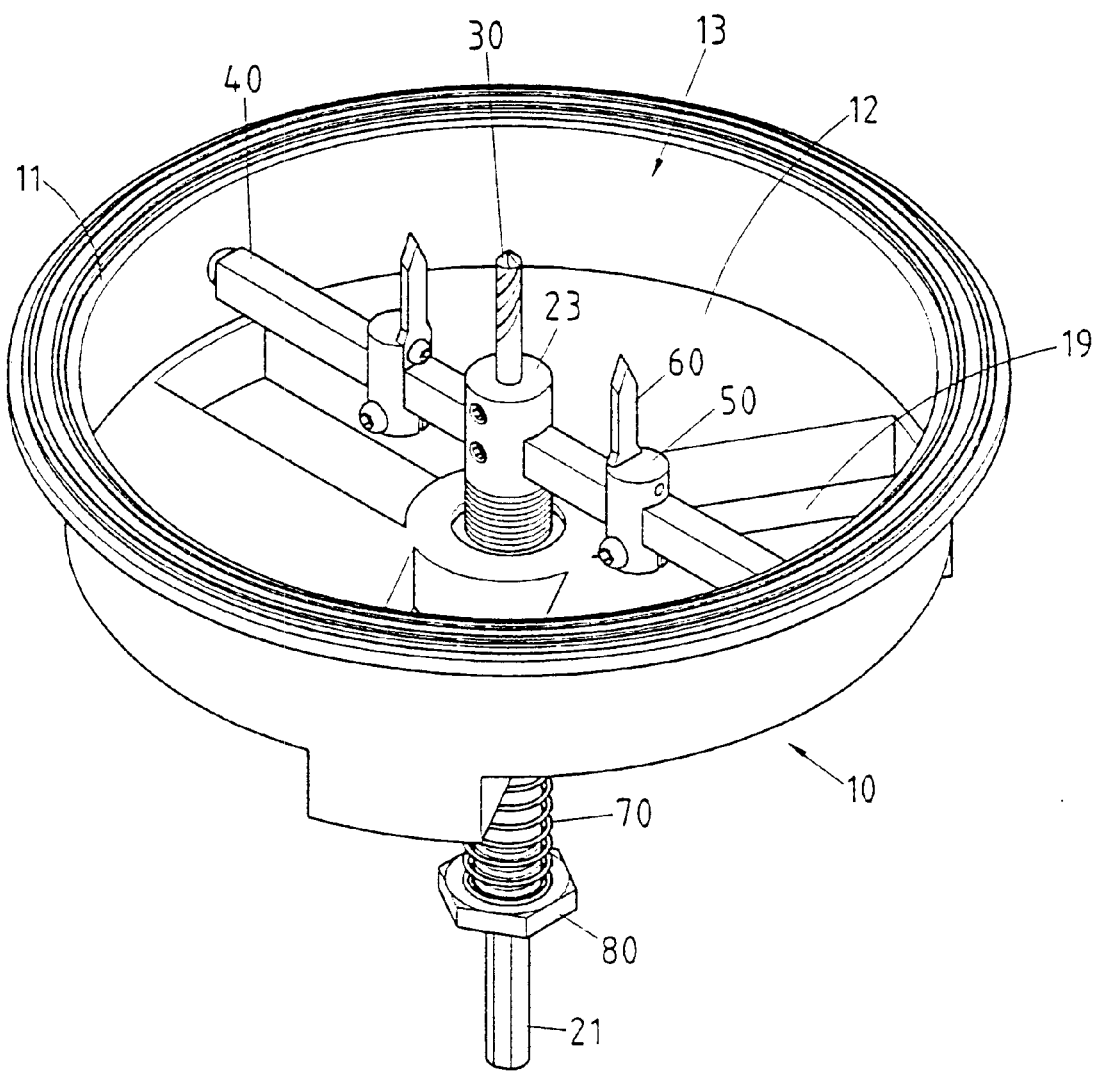
FIG. 2 shows a schematic view of a ceiling driller of the preferred embodiment of the present invention.
Figure 3:
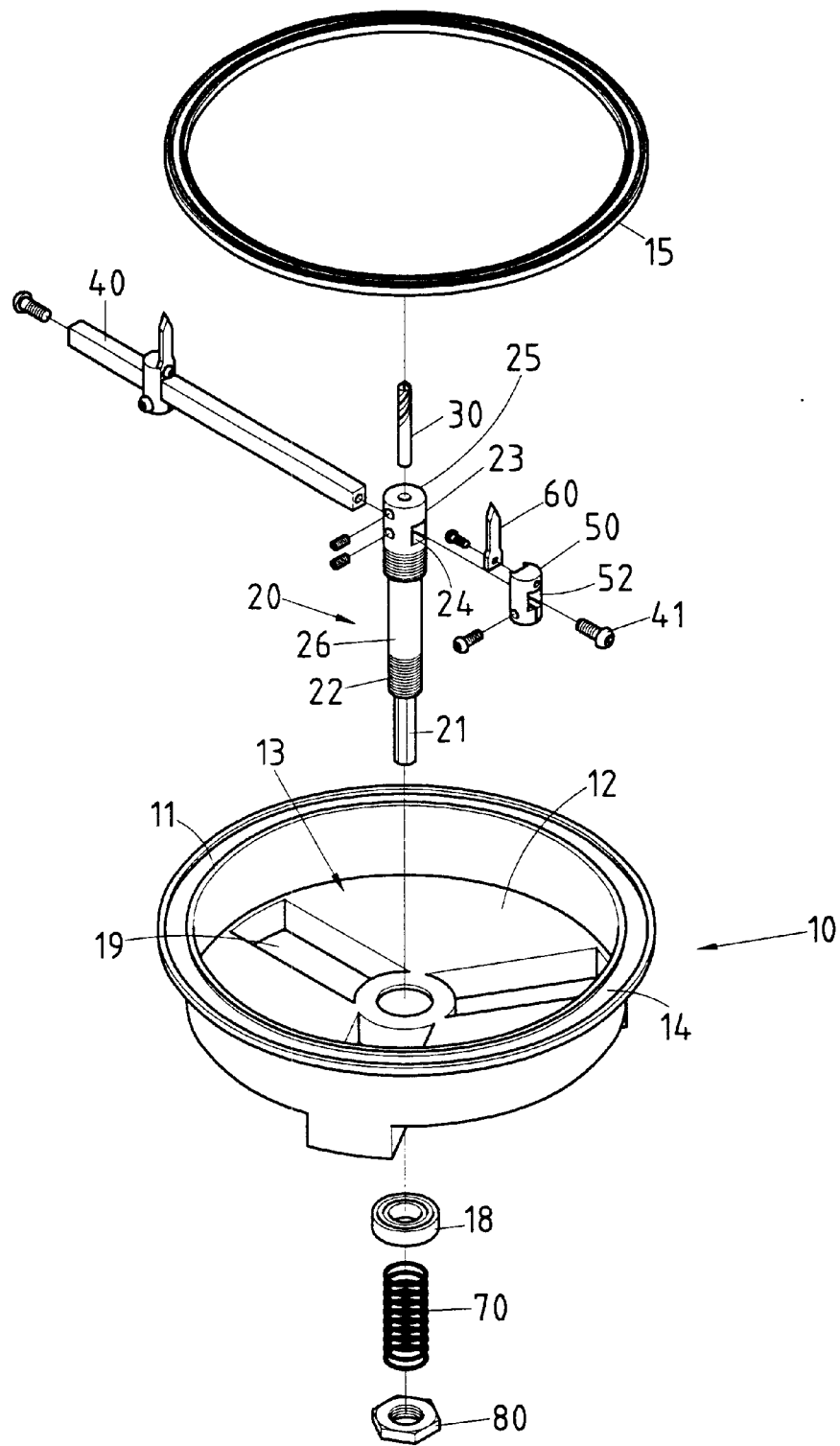
FIG. 3 shows an exploded view of the ceiling driller of the preferred embodiment of the present invention.
Figure 4:
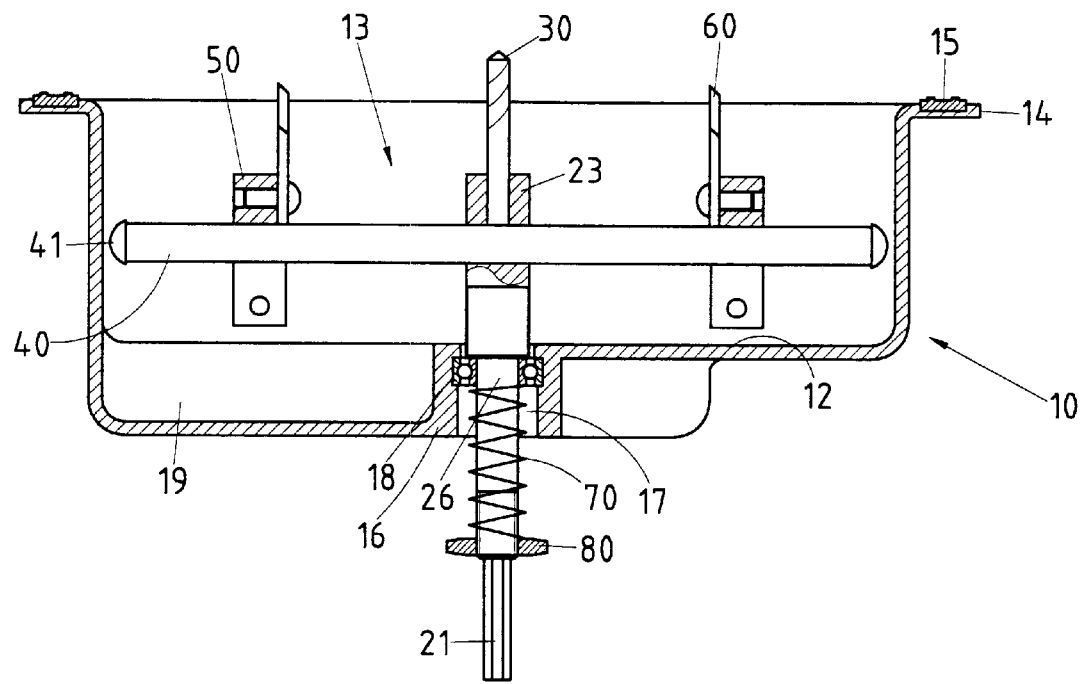
FIG. 4 shows a sectional view of the ceiling driller of the preferred embodiment of the present invention.
Figure 5:
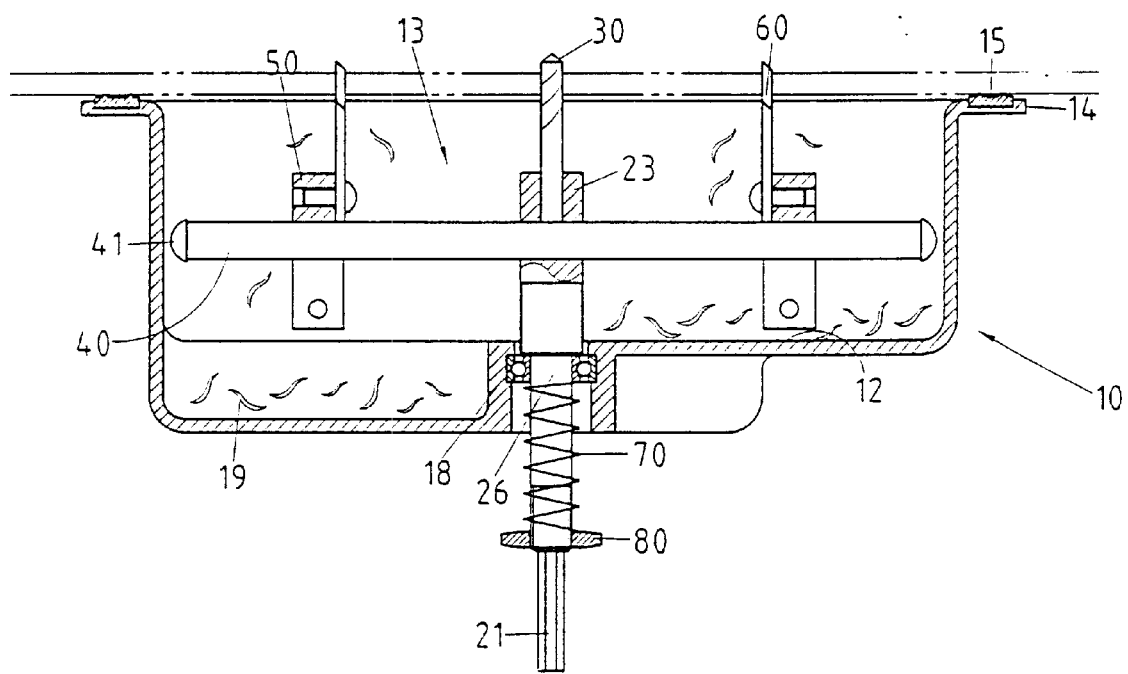
FIG. 5 shows a schematic view of the present invention at work.

As shown in FIGS. 2–5, a ceiling driller of the preferred embodiment of the present invention comprises a dust collector 10, a seat rod 20, a drill bit 30, an adjustment rod 40, two tool mounting seats 50, two machining tools 60, a spring 70, and a nut 80.

The dust collector 10 has an open end 1 1 facing the ceiling, and a closed end 12 opposite to the open end 11. The dust collector 10 is provided with a receiving space 13 and a brim 14 in which a ring 15 is disposed. The closed end 12 is provided in the inner side with a plurality of machining dust collecting slots 19. The closed end 12 is further provided in the center with a bearing 18. The closed end 12 is provided with a tubular portion 16 having a stepped hole 17.

The seat rod 20 has an actuating end 21 and a head end 23. The actuating end 21 is provided with an outer threaded portion 22. The head end is provided with a through hole 24 and a locating hole 25. Located between the actuating end 21 and the head end 23 is an insertion portion 26.

The drill bit 30 is located in the locating hole 25.

The adjustment rod 40 is provided at both longitudinal ends with a protrusion 41 and is received in the through hole 24 of the head end 23 of the seat rod 20.

The two tool mounting seats 50 are provided with a through hole 52 by means of which the tool mounting seats 50 are mounted oppositely on the adjustment rod 40. The tool mounting seats 50 are further provided with a slotted surface 51.

The machining tools 60 are fastened to the surface 51 of tool mounting seats 50 by a fastening screw such that the machining tools 60 face in the same direction as the drill bit 30.

The spring 70 is fitted over the actuating end 21 of the seat rod 20, which is received in the stepped hole 17 of the tubular portion 16 of the closed end 12 of the dust collector 10 such that the insertion portion 26 of the seat rod 20 is received in the bearing 18.

The nut 80 is engaged with the outer threaded portion 22 of the seat rod 20.

In operation, the machining dust is first deposited in the receiving space 13 of the dust collector 10. The rotational motion of the seat rod 20 and the machining tool 60 brings about an air current, which forces the machining dust to move from the receiving space 13 into the machining dust collecting slots 19 of the dust collector 10. In light of the dust collection being confined to the dust collecting slots 19, the view of an operator of the ceiling driller is not totally obstructed by the machining dust.

I claim:

1. A ceiling driller comprising:

a dust collector having an open end and a closed end opposite to said open end, said closed end provided with a tubular portion having a stepped hole, said closed end having a planar surface facing said open end, said closed end having a plurality of dust collecting slots formed in said planar surface and extending radially outwardly from said tubular portion of said dust collecting slots having a bottom positioned a greater distance from said open end than a distance of said planar surface from said open end;

a seat rod having an actuating end and a head end, said actuating end provided with an outer threaded portion, said head end provided with a through hole and a locating hole, said seat rod having an insertion portion located between said actuating end and said head end;

a drill bit located in said locating hole of said head end of said seat rod;

an adjustment rod having a protrusion at both longitudinal ends thereof, said adjustment rod received in said through hole of said head end of said seat rod;

two tool mounting seats mounted on opposite sides of said seat rod on said adjustment rod, each of said two tool mounting seats provided with a slotted surface;

two machining tools respectively fastened to said slotted surface of said tool mounting seats;

a spring fitted over said actuating end of said seat rod; and a nut engaged with said outer threaded portion of said seat rod.

* * * * *